United States Patent
Kashiwagi et al.

(10) Patent No.: US 8,440,776 B2
(45) Date of Patent: May 14, 2013

(54) LENS-FORMING SILICONE RESIN COMPOSITION AND SILICONE LENS

(75) Inventors: Tsutomu Kashiwagi, Annaka (JP); Toshio Shiobara, Annaka (JP); Katsuyuki Imazawa, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 249 days.

(21) Appl. No.: 12/759,293

(22) Filed: Apr. 13, 2010

(65) Prior Publication Data

US 2010/0197870 A1 Aug. 5, 2010

Related U.S. Application Data

(63) Continuation of application No. 11/437,664, filed on May 22, 2006, now abandoned.

(30) Foreign Application Priority Data

May 23, 2005 (JP) ................................. 2005-149293

(51) Int. Cl.
*C08G 77/20* (2006.01)
(52) U.S. Cl.
USPC .............................................. 528/32; 528/31
(58) Field of Classification Search .................... 528/31, 528/32
See application file for complete search history.

(56) References Cited

U.S. PATENT DOCUMENTS

| | | | |
|---|---|---|---|
| 3,974,122 A | 8/1976 | Sato et al. | |
| 6,285,513 B1 | 9/2001 | Tsuji et al. | |
| 7,595,113 B2 | 9/2009 | Miyoshi | |
| 2004/0116640 A1 | 6/2004 | Miyoshi | |
| 2007/0244214 A1 | 10/2007 | Yoshitake et al. | |

FOREIGN PATENT DOCUMENTS

| | | |
|---|---|---|
| JP | 58-31314 A | 2/1983 |
| JP | 10-158400 A | 6/1998 |
| JP | 2000-17176 A | 1/2000 |
| JP | 2000-231002 A | 8/2000 |
| JP | 2004-186168 A | 7/2004 |
| JP | 2004-221308 A | 8/2004 |
| JP | 2004-292714 A | 10/2004 |
| JP | 2005-179541 A | 7/2005 |
| JP | 2006-137895 A | 6/2006 |
| JP | 2006-299099 A | 11/2006 |
| JP | 2006-324596 A | 11/2006 |

OTHER PUBLICATIONS

G.G. Freeman, "Silicones", London-life Books. Ltd., 1962, pp. 27.
Japanese Office Action mailed Sep. 30, 2009, issued in corresponding Japanese Application No. 2005-149293.

*Primary Examiner* — Kuo-Liang Peng
(74) *Attorney, Agent, or Firm* — Westerman, Hattori, Daniels & Adrian, LLP

(57) ABSTRACT

Silicone resin compositions comprising (A) an organopolysiloxane containing at least two aliphatic unsaturated bonds and having a viscosity of 100-1,000,000 mPa·s at 25° C., (B) an organohydrogenpolysiloxane having at least three silicon-bonded hydrogen atoms (SiH groups) in the form of $HR^6{}_2SiO$—, and (C) a platinum group metal base catalyst cure into colorless transparent parts which are useful lenses.

8 Claims, 1 Drawing Sheet

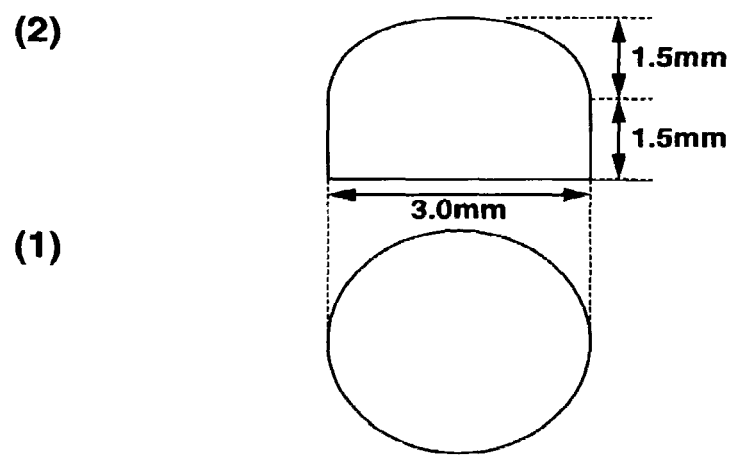
(2)
(1)

LENS-FORMING SILICONE RESIN COMPOSITION AND SILICONE LENS

CROSS-REFERENCE TO RELATED APPLICATION

This non-provisional application is a continuation of U.S. application Ser. No. 11/437,664, filed on May 22, 2006 which claims priority under 35 U.S.C. §119(a) on Patent Application No. 2005-149293 filed in Japan on May 23, 2005, the entire contents of which are hereby incorporated by reference.

TECHNICAL FIELD

This invention relates to a silicone resin composition of the addition cure type for forming lenses, and more particularly, to a silicone resin composition with ease of molding for forming substantially surface tack-free silicone lenses having improved transparency. It also relates to a silicone lens obtained by molding and curing the silicone resin composition and suited for use in LED devices.

BACKGROUND ART

Lenses for use in light-emitting diode (LED) devices are mass manufactured by mechanical forming such as injection molding. Although prior art lenses are molded using thermoplastic resins such as acrylic resins and polycarbonate resins, the currently increasing power of LED devices invites the problem that thermoplastic resins' heat resistance and discoloration resistance are short.

Also, lead-free solders are often used nowadays. Since the lead-free solders have a higher melting temperature than conventional solders, optical devices are usually soldered to substrates while heating at a temperature of 260° C. or higher. When soldering at such high temperature, lenses of prior art thermoplastic resins can no longer be used because the lenses will deform or yellow due to the heat.

Under the circumstances, a number of studies have been made on the use of silicone resins in the lenses associated with LED or the like. However, when lenses are manufactured from silicone resins by forming techniques such as injection molding, the silicone resins which are thermosetting resins need a long molding time as compared with prior art thermoplastic resins. Slow curing leaves a possibility of weld-line formation. There is a need to eliminate these deficiencies.

The references pertinent to the present invention include JP-A 2000-231002 corresponding to U.S. Pat. No. 6,285,513, JP-A 2000-17176, and JP-A 2004-221308.

DISCLOSURE OF THE INVENTION

An object of the invention is to provide a lens-forming silicone resin composition that has overcome the drawbacks of the prior art and offers a satisfactory cured lens within a brief molding time; and a silicone lens obtained by molding and curing the composition.

The inventors have found that a lens-forming silicone resin composition comprising the following components attains the above and other objects while reducing the molding time.

The present invention provides a lens-forming silicone resin composition comprising as essential components, (A) an organopolysiloxane containing at least two aliphatic unsaturated bonds in a molecule and having a viscosity of at least 100 mPa·s at 25° C., (B) an organohydrogenpolysiloxane having in a molecule at least three hydrogensiloxy structures of the following formula:

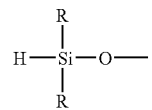

wherein R is a monovalent hydrocarbon group, and (C) a platinum group metal base catalyst, the composition becoming colorless and transparent when cured.

Also contemplated herein is a silicone lens obtained by molding and curing the silicone resin composition.

BENEFITS OF THE INVENTION

By molding and curing the silicone resin composition of the invention, silicone lenses can be manufactured within a brief time.

BRIEF DESCRIPTION OF THE DRAWING

FIG. 1 schematically illustrates the shape of a lens molded from the compositions of Examples and Comparative Examples, FIG. 1(1) being a plane view and FIG. 1(2) being a side view.

DESCRIPTION OF THE PREFERRED EMBODIMENTS

Component A

Component (A) is any of organopolysiloxanes containing in a molecule at least two aliphatic unsaturated bonds, typically alkenyl groups of 2 to 8 carbon atoms, preferably 2 to 6 carbon atoms, such as vinyl and allyl. They should also have a viscosity of at least 100 mPa·s at 25° C., preferably at least 1,000 mPa·s at 25° C. Of these, linear organopolysiloxanes, represented by the following formula (1), containing at least one alkenyl group on the silicon atom at either end of the molecular chain and having a viscosity of at least 100 mPa·s at 25° C. are desired for efficient working and curing.

When lenses are manufactured by a molding machine such as an injection molding machine, a resin with too low a viscosity will penetrate into ejector pin-mold junctures and parting lines, giving rise to the trouble that lenses are formed with burrs or the ejector pins become inoperable even when the mold is opened. For this reason, a viscosity of at least 100 mPa·s is necessary. If the viscosity exceeds 1,000,000 mPa·s during mixing, thorough mixing by a static mixer may be impeded. Thus the viscosity should preferably be less than or equal to 1,000,000 mPa·s.

It is noted that the linear organopolysiloxane may contain a small proportion of branched structure (trifunctional siloxane units) in the molecular chain.

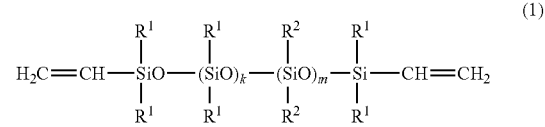

Herein $R^1$ is each independently a substituted or unsubstituted monovalent hydrocarbon group, $R^2$ is each independently an aliphatic unsaturation-free, substituted or unsubstituted monovalent hydrocarbon group, k and m each are 0 or a positive integer, k+m is such a number that the organopolysiloxane has a viscosity of 100 to 1,000,000 mPa·s at 25° C.

The monovalent hydrocarbon groups represented by $R^1$ are preferably those of 1 to 10 carbon atoms, more preferably of 1 to 6 carbon atoms, for example, alkyl groups such as methyl, ethyl, propyl, isopropyl, butyl, isobutyl, tert-butyl, pentyl, neopentyl, hexyl, cyclohexyl, octyl, nonyl and decyl; aryl groups such as phenyl, tolyl, xylyl and naphthyl; aralkyl groups such as benzyl, phenylethyl and phenylpropyl; alkenyl groups such as vinyl, allyl, propenyl, isopropenyl, butenyl, hexenyl, cyclohexenyl and octenyl; and substituted forms of the foregoing in which some or all hydrogen atoms are substituted by halogen atoms (fluoro, bromo, chloro) or cyano groups, including halogenated alkyl groups such as chloromethyl, chloropropyl, bromoethyl and trifluoropropyl, and cyanoethyl.

The monovalent hydrocarbon groups represented by $R^2$ are also preferably those of 1 to 10 carbon atoms, more preferably of 1 to 6 carbon atoms, examples of which are the same as exemplified above for $R^1$, with the proviso that alkenyl groups are excluded.

The subscripts k and m each are 0 or a positive integer, typically satisfying $5 \leq k+m \leq 10,000$. Preferably k and m are positive integers satisfying $10 \leq k+m \leq 2,000$ and $0 < k/(k+m) \leq 0.2$.

r

Illustrative, non-limiting examples of the organopolysiloxane (A) are given below.

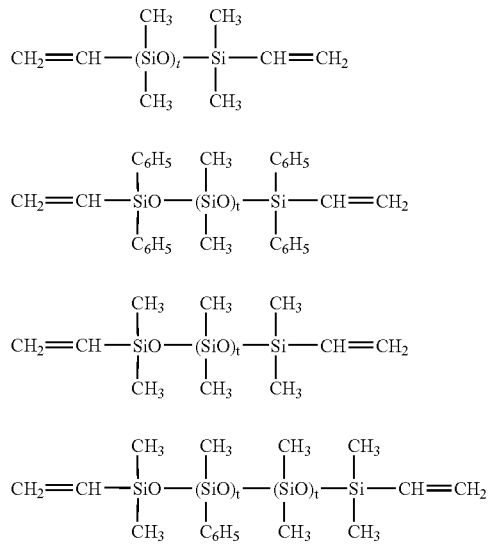

In these formulae, t is an integer of 8-2000.

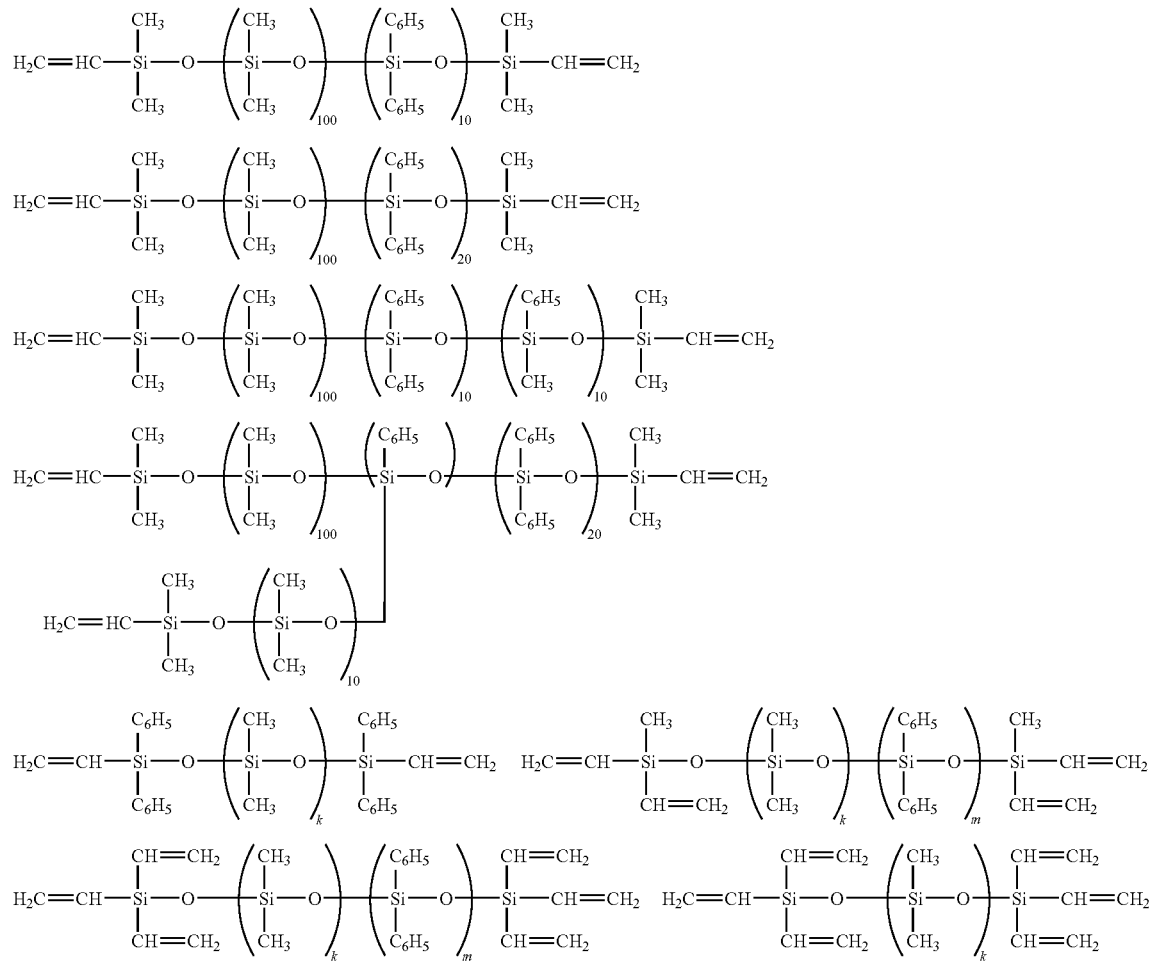

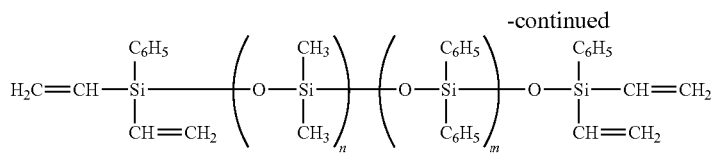

In these formulae, k and m are as defined above.

Also employable as component (A) are organopolysiloxanes of resin structure. The preferred organopolysiloxanes of resin structure are vinyl-containing organopolysiloxanes having the average compositional formula:

$$(R^3SiO_{1.5})_x(R^4{}_2SiO)_y(R^5{}_3SiO_{0.5})_z$$

wherein $R^3$, $R^4$ and $R^5$ are each independently a substituted or unsubstituted monovalent hydrocarbon group, 2 to 45 mol % of the entire monovalent hydrocarbon groups being vinyl, x, y and z representative of the molar ratio of corresponding siloxane units are such numbers that $x/(x+y+z)$ is from 0.3 to 0.95, $y/(x+y+z)$ is from 0.05 to 0.50, and $z/(x+y+z)$ is from 0 to 0.05.

The monovalent hydrocarbon groups represented by $R^3$, $R^4$ and $R^5$ include those of 1 to 10 carbon atoms, preferably 1 to 8 carbon atoms, for example, alkyl groups such as methyl, ethyl and propyl, alkenyl groups such as vinyl, and aryl groups such as phenyl. Halogenated forms of these hydrocarbon groups are also included. It is requisite that 2 to 45 mol %, especially 5 to 30 mol % of the entire monovalent hydrocarbon groups be vinyl. If the number of vinyl groups is less than 2 mol %, the addition reaction with component (B) to be described later results in a low crosslinking density, failing to form molded parts with improved mechanical strength. If the number of vinyl groups is more than 45 mol %, molded parts may become brittle.

The subscripts x, y and z representative of the molar ratio of corresponding siloxane units are numbers as defined above, and preferably such numbers that $x/(x+y+z)$ is from 0.4 to 0.8, $y/(x+y+z)$ is from 0.1 to 0.5, and $z/(x_++y_+z)$ is from 0 to 0.04.

These vinyl-containing organopolysiloxanes can be obtained by co-hydrolytic condensation of a mixture of two or more halosilanes or alkoxysilanes corresponding to the respective siloxane units.

Illustrative examples of the respective siloxane units in the above average compositional formula include monovinylsiloxane, monomethylsiloxane, monoethylsiloxane, monophenylsiloxane, divinylsiloxane, phenylvinylsiloxane, methylphenylsiloxane, diphenylsiloxane, dimethylsiloxane, trivinylsiloxane, divinylmethylsiloxane, divinylphenylsiloxane, vinyldimethylsiloxane, vinylphenylmethylsiloxane, trimethylsiloxane, dimethylphenylsiloxane, methyldiphenylsiloxane, triphenylsiloxane, etc., and substituted siloxanes in which hydrogen atoms of organic groups are substituted by halogen or the like.

It is noted that the inclusion of $SiO_2$ units is acceptable as long as this does not compromise the objects of the invention.

Component B

Component (B) is an organohydrogenpolysiloxane which serves as a crosslinking agent such that addition reaction takes place between SiH groups in component (B) and vinyl groups in component (A) to form a cured product. It may be any of organohydrogenpolysiloxanes having in a molecule at least three hydrogen atoms each of which is bonded to the silicon atom present at the terminal of the molecular chain, i.e., at least three hydrogensiloxy structures of the following formula:

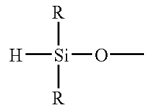

wherein R is a monovalent hydrocarbon group which is as defined below for $R^6$.

Preferred are organohydrogenpolysiloxanes having the average compositional formula:

$$H_a(R^6)_bSiO_{(4-a-b)/2} \qquad (2)$$

wherein $R^6$ is each independently an aliphatic unsaturation-free, substituted or unsubstituted monovalent hydrocarbon group, a and b are positive numbers satisfying $0.001 \leq a < 2$, $0.7 \leq b \leq 2$, and $0.8 \leq a+b \leq 3$. The organohydrogenpolysiloxanes should have at least three, typically 3 to about 100, preferably 3 to about 30, silicon-bonded hydrogen atoms (SiH groups) in the form of $HR^6{}_2SiO$— in a molecule.

More particularly, $R^6$ in formula (2) may be the same or different and is a substituted or unsubstituted monovalent hydrocarbon group free of aliphatic unsaturation, preferably having 1 to 10 carbon atoms, more preferably 1 to 7 carbon atoms, for example, lower alkyl groups such as methyl, aryl groups such as phenyl, and the like, as exemplified above for $R^2$ in formula (1). The subscripts a and b are positive numbers satisfying $0.001 \leq a < 2$, $0.7 \leq b \leq 2$, and $0.8 \leq a+b \leq 3$, and preferably $0.05 \leq a \leq 1$, $0.8 \leq b \leq 2$, and $1 \leq a+b \leq 2.7$. The location of silicon-bonded hydrogen atoms is not particularly limited, and may be either an end or an intermediate of the molecular chain. The inclusion of at least three silicon-bonded hydrogen atoms at ends of the molecular chain is typical.

Examples of the organohydrogenpolysiloxane include tris(dimethylhydrogensiloxy)methylsilane, tris(dimethylhydrogensiloxy)phenylsilane, copolymers of $(CH_3)_2HSiO_{1/2}$ units and $SiO_{4/2}$ units, and copolymers of $(CH_3)_2HSiO_{1/2}$ units, $SiO_{4/2}$ units, and $(C_6H_5)SiO_{3/2}$ units.

Compounds of the structure shown below are also useful.

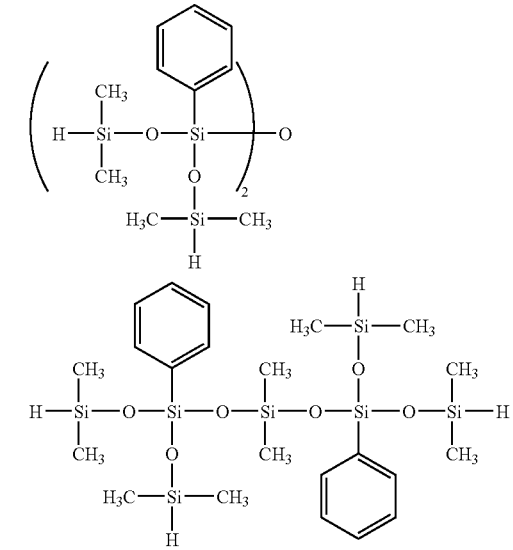

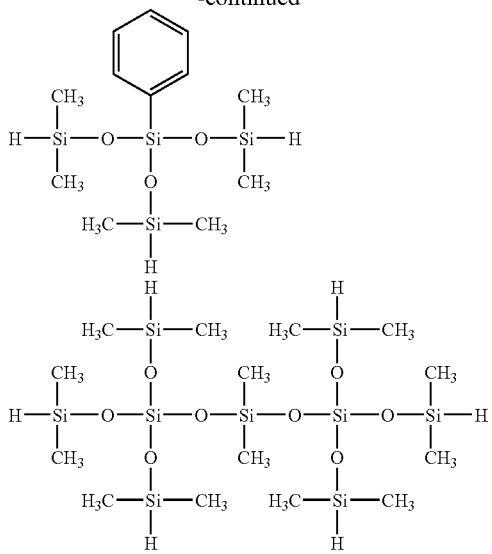

The molecular structure of the organohydrogenpolysiloxane may be linear, cyclic, branched or three-dimensional network. Preferably, the number of silicon atoms per molecule or the degree of polymerization is about 3 to about 1,000, preferably about 3 to about 300.

Such an organohydrogenpolysiloxane is generally prepared through hydrolysis of chlorosilanes such as $R^6SiHCl_2$, $(R^6)_3SiCl$, $(R^6)_2SiCl_2$ and $(R^6)_2SiHCl$, wherein $R^6$ is as defined above, or hydrolysis of chlorosilanes and subsequent equilibration of the resultant siloxane.

The organohydrogenpolysiloxane may be compounded in an effective amount for component (A) to cure, preferably in such amounts that the molar ratio of SiH groups to the total of alkenyl groups (e.g., vinyl) in component (A) is 0.1-4.0:1, more preferably 1.0-3.0:1, and most preferably 1.2-2.8:1. A molar ratio of less than 0.1 may allow curing reaction to proceed little and make it difficult to produce cured silicone. If the molar ratio is more than 4.0, more SiH groups may be left unreacted in the cured composition which will change its physical properties with time.

Component C

The platinum group metal-based catalyst is compounded for inducing addition cure reaction to the inventive composition. Platinum, palladium and rhodium base catalysts are included. Of these, platinum base catalysts are preferred from the economical standpoint. Examples include platinum, platinum black and chloroplatinic acid, and more specifically $H_2PtCl_6 \cdot mH_2O$, $K_2PtCl_6$, $KHPtCl_6 \cdot mH_2O$, $K_2PtCl_4$, $K_2PtCl_4 \cdot mH_2O$, and $PtO_2 \cdot mH_2O$ wherein m is a positive integer, and complexes thereof with hydrocarbons (e.g., olefins), alcohols and vinyl-containing organopolysiloxanes. They may be used alone or in admixture. The catalyst (C) may be used in a catalytic amount, specifically in an amount to give about 0.1 to 1,000 ppm, more preferably about 0.5 to 200 ppm of platinum group metal based on the weight of components (A) and (B) combined.

The silicone resin composition of the invention is prepared by intimately mixing the above-mentioned components. Most often, the composition is stored in two packages so that no cure occurs. On use, the two packages are combined, allowing the composition to cure. The composition may, of course, be of one-package type if a small amount of a cure inhibitor such as acetylene alcohol is added.

Optionally, well-known additives including antioxidants, ultrafine silica such as Aerosil®, and inorganic fillers having a matching refractive index with the silicone resin may be compounded for the purposes of improving mechanical strength, adjusting a coefficient of expansion or the like as long as this is not detrimental to transparency.

When lenses are manufactured by injection molding or otherwise forming the silicone resin composition, the composition of two-package type is more productive because rapid reaction occurs after mixing of the two packages. For mixing, an ordinary mixing device such as a static mixer is used. The mixture is directly fed to an injection molding machine and pressure molded in the mold. The molding conditions are not particularly limited and include a temperature of 120 to 180° C. and a time of about 30 to 90 seconds although exact molding conditions depend on the curability of the silicone resin composition. The composition may be post-cured at 100 to 200° C. for 30 minutes to 20 hours if desired.

The silicone resin composition of the invention cures into colorless transparent parts and is thus suitable for the manufacture of lenses including lenses for LED devices, laser pickup lenses and high-temperature resin lenses.

EXAMPLE

Examples and Comparative Examples are given below for further illustrating the invention, but the invention is not limited thereto. In Examples, all parts are by weight, and the viscosity is as measured at 25° C. by a rotational viscometer. Abbreviations Me, Vi, and Ph stand for methyl, vinyl, and phenyl, respectively.

Reference Example 1

With vigorous stirring, a mixture of 698 parts of phenyltrichlorosilane, 169 parts of methylvinyldichlorosilane, 194 parts of dimethyldichlorosilane and 530 parts of toluene was added dropwise to 2,500 parts of water over 60 minutes. Stirring was continued for a further 60 minutes, after which the toluene solution was washed with water until neutral. After water washing, the toluene solution was adjusted to a siloxane concentration of 25%. 0.42 part of potassium hydroxide was added to the toluene solution which was heated under reflux for 5 hours for polymerization. Then 13.8 parts of trimethylchlorosilane was added to the solution, followed by stirring for 60 minutes at room temperature, neutralization of the alkali, and removal of residual silanol groups. This was filtered and heated under vacuum for distilling off the toluene, leaving a transparent vinyl-bearing organopolysiloxane.

Example 1

To 50 parts of a polysiloxane (VF) having the formula (i) were added 50 parts of a vinylmethylsiloxane (VMQ) of resin structure consisting of 50 mol % $SiO_2$ units, 42.5 mol % $(CH_3)_3SiO_{0.5}$ units and 7.5 mol % $Vi_3SiO_{0.5}$ units, an amount to give a 1.5-fold molar amount of SiH groups relative to the total of vinyl groups in the VF and VMQ components of an organohydrogenpolysiloxane having the formula (ii) and 0.05 part of an octyl alcohol-modified chloroplatinic acid solution. By thoroughly mixing the ingredients, a silicone resin composition was prepared.

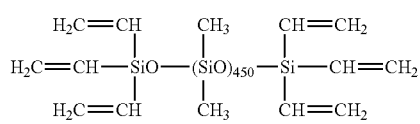

(i)

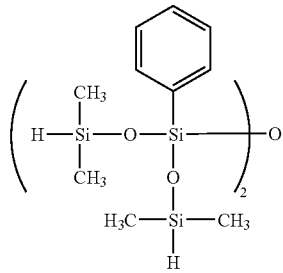

(ii)

Example 2

A silicone resin composition was prepared by mixing 100 parts of the vinyl-bearing organopolysiloxane obtained in Reference Example 1 with 30 parts of an organohydrogenpolysiloxane having the following formula and 0.05 part of a 1% octyl alcohol-modified chloroplatinic acid solution.

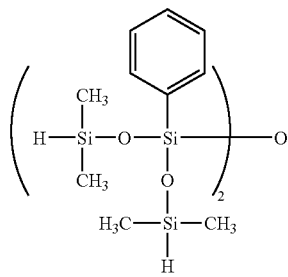

Example 3

A silicone resin composition was prepared as in Example 2 except that the crosslinking agent was replaced by 25 parts of a crosslinking agent of the following formula.

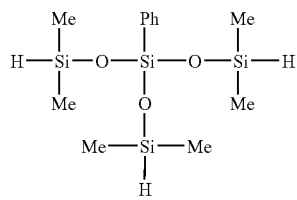 [SMILES: C[SiH](C)O[Si](O[SiH](C)C)(O[SiH](C)C)c1ccccc1]

Example 4

A silicone resin composition was prepared as in Example 2 except that the crosslinking agent was replaced by 24.9 parts of a crosslinking agent of the following formula.

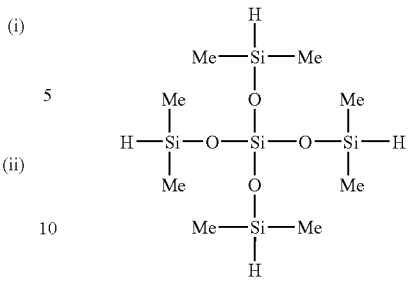

Comparative Example 1

A silicone resin composition was prepared as in Example 2 except that the crosslinking agent was replaced by 33 parts of a crosslinking agent of the following formula.

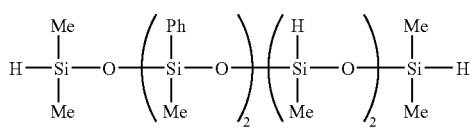

Comparative Example 2

A silicone resin composition was prepared as in Example 2 except that the crosslinking agent was replaced by 40 parts of a crosslinking agent of the following formula.

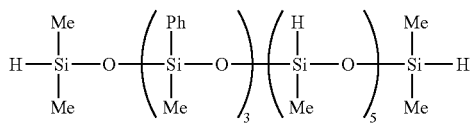

Comparative Example 3

A silicone resin composition was prepared as in Example 2 except that the crosslinking agent was replaced by 30 parts of a crosslinking agent of the following formula.

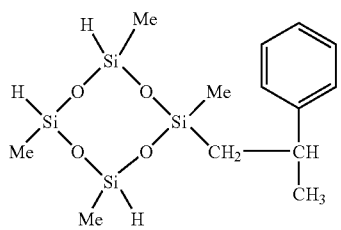

From the silicone resin compositions of Examples 1-4 and Comparative Examples 1-3, lenses were molded using a 20-ton injection molding machine equipped with a multiple-cavity mold capable of forming 16 parts in one shot. The lens has a dome shape as shown in FIG. 1. The resin composition was molded under conditions: an injection pressure of 20 MPa·s, a curing temperature of 150° C., and a curing time of 90 seconds, after which the cured resin or lenses were taken out of the mold cavities. It was observed how hard the cured resin was when taken out of the mold cavity and how smoothly the cured resin could be released from the mold cavity. Additionally, the hardness of the cured resin or lens as taken out was measured at room temperature according to JIS 6253 using a Type D durometer. The lenses were post-cured at 150° C. for 4 hours, after which the hardness was measured again.

The test methods and criteria are shown below.

Cure
Full: strength (or resin hardness) enough to withstand practical handling
Under: strength (or resin hardness) insufficient to withstand practical handling
Mold Release
Good: smooth release from the mold
Poor: non-smooth release from the mold

TABLE 1

|  | Example | | | |
|---|---|---|---|---|
|  | 1 | 2 | 3 | 4 |
| Cure | Full | Full | Full | Full |
| Mold release | Good | Good | Good | Good |
| Resin hardness, Type D | 15 | 50 | 50 | 50 |
| Post-cured resin hardness, Type D | 30 | 75 | 75 | 75 |

TABLE 2

|  | Comparative Example | | |
|---|---|---|---|
|  | 1 | 2 | 3 |
| Cure | Under | Under | Under |
| Mold release | Poor | Poor | Poor |
| Resin hardness, Type D | UM | UM | UM |
| Post-cured resin hardness, Type D | 30 | 75 | 75 |

* UM: unmeasurable

Japanese Patent Application No. 2005-149293 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method of improving mold release of a silicone lens from a mold cavity upon injection molding a colorless and transparent silicone resin composition free of mold release agent for forming the silicone lens comprising subjecting a lens-forming silicone resin composition comprising
   (A) an organopolysiloxane containing at least two aliphatic unsaturated bonds in a molecule and having a viscosity of at least 100 mPa·s at 25° C.,
   (B) an organohydrogenpolysiloxane having in a molecule at least four hydrogensiloxy structures of the following formula $$\text{H}-\underset{\underset{R}{|}}{\overset{\overset{R}{|}}{\text{Si}}}-\text{O}-$$

wherein R is a monovalent hydrocarbon group, and
   (C) a platinum group metal base catalyst, to injection mold in the mold cavity, and then to take out a molded product from the mold cavity, thereby obtaining a colorless and transparent silicone lens.

2. The method of claim 1 wherein component (A) is an organopolysiloxane of resin structure having the average compositional formula:

$$(R^3SiO_{1.5})_x(R^4{}_2SiO)_y(R^5{}_3SiO_{0.5})_z$$

wherein $R^3$, $R^4$ and $R^5$ are each independently a substituted or unsubstituted monovalent hydrocarbon group, 2 to 45 mol % of the entire monovalent hydrocarbon groups being vinyl, x, y and z representative of the molar ratio of corresponding siloxane units are such numbers that x/(x+y+z) is 0.45 to 0.95, y/(x+y+z) is 0.05 to 0.50, and z/(x+y+z) is 0 to 0.05.

3. The method of claim 1 wherein component (B) is an organohydrogenpolysiloxane having the average compositional formula:

$$H_a(R^6)_bSiO_{(4-a-b)/2} \quad (2)$$

wherein $R^6$ is each independently an aliphatic unsaturation-free, substituted or unsubstituted monovalent hydrocarbon group, a and b are positive numbers satisfying $0.001 \leq a < 2$, $0.7 \leq b \leq 2$, and $0.8 \leq a+b \leq 3$,
said organohydrogenpolysiloxane having at least four silicon-bonded hydrogen atoms (SiH groups) in the form of $HR^6{}_2SiO$— in a molecule.

4. The method of claim 1 wherein component (B) is selected from organohydrogenpolysiloxane having the following formulae:

and

5. A method of forming a silicone lens comprising injection molding a colorless and transparent silicone resin composition free of mold release agent comprising
   (A) an organopolysiloxane containing at least two aliphatic unsaturated bonds in a molecule and having a viscosity of at least 100 mPa·s at 25° C.,
   (B) an organohydrogenpolysiloxane having in a molecule at least four hydrogensiloxy structures of the following formula:

$$\text{H}-\underset{\underset{R}{|}}{\overset{\overset{R}{|}}{\text{Si}}}-\text{O}-$$

wherein R is a monovalent hydrocarbon group, and
   (C) a platinum group metal base catalyst in a mold cavity, thereby obtaining a colorless and transparent silicone lens.

6. The method of claim 5 wherein component (A) is an organopolysiloxane of resin structure having the average compositional formula:

$$(R^3SiO_{1.5})_x(R^4{}_2SiO)_y(R^5{}_3SiO_{0.5})_z \quad (5)$$

wherein $R^3$, $R^4$ and $R^5$ are each independently a substituted or unsubstituted monovalent hydrocarbon group. 2 to 45 mol % of the entire monovalent hydrocarbon groups being vinyl, x, y and z representative of the molar ratio of corresponding siloxane units are such numbers that x/(x+y+z) is 0.45 to 0.95, y/(x+y+z) is 0.05 to 0.50, and z/(x+y+z) is 0 to 0.05.

7. The method of claim 5 wherein component (B) is an organohydrogenpolysiloxane having the average compositional formula:

$$H_a(R^6)_bSiO_{(4-a-b)/2} \quad (2)$$

wherein $R^6$ is each independently an aliphatic unsaturation-free, substituted or unsubstituted monovalent hydrocarbon group, a and b are positive numbers satisfying $0.001 \leq a < 2$, $0.7 \leq b \leq 2$, and $0.8 \leq a+b \leq 3$, said organohydrogenpolysiloxane having at least four silicon-bonded hydrogen atoms (SiH groups) in the form of $HR^6{}_2SiO$— in a molecule.

8. The method of claim 5 wherein component (B) is selected from organohydrogenpolysiloxane having the following formulae:

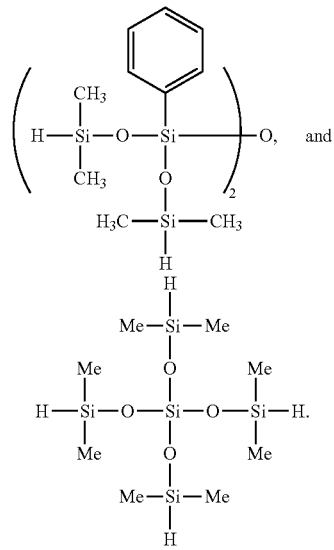

* * * * *